United States Patent Office.

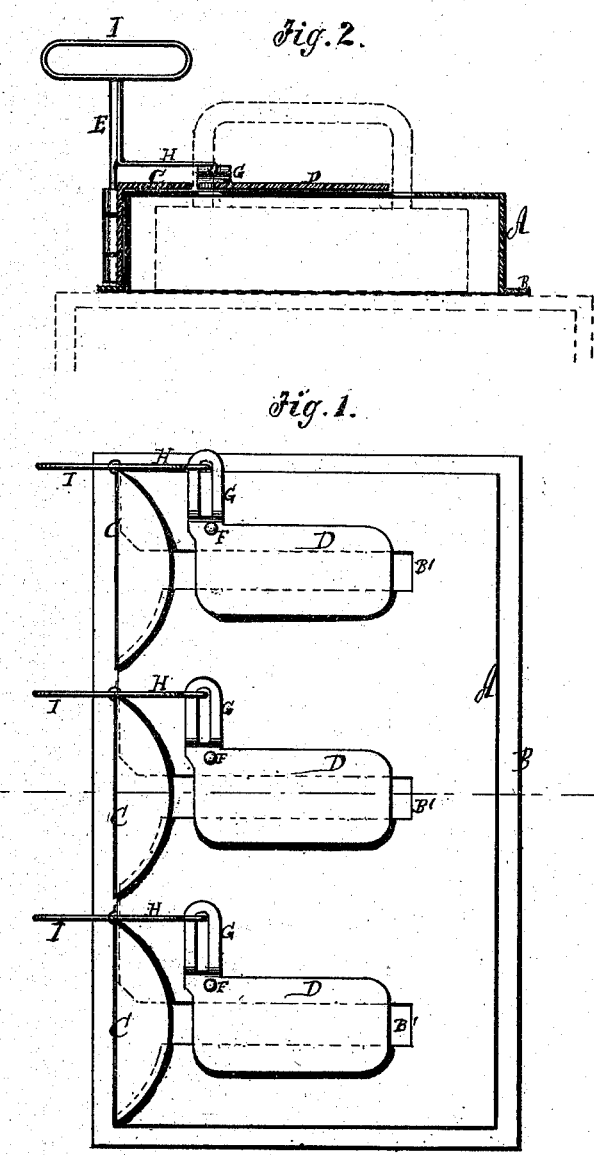

GORDON O. HANKS, OF ADDISON, VERMONT.

Letters Patent No. 100,525, dated March 8, 1870.

SAD-IRON HEATER.

The Schedule referred to in these Letters Patent and making part of the same.

*To all whom it may concern:*

Be it known that I, GORDON O. HANKS, of Addison, in the county of Addison, and State of Vermont, have invented a new and useful Improvement in Flat-Iron Heater; and I do hereby declare that the following is a full, clear, and exact description thereof, which will enable others skilled in the art to make and use the same, reference being had to the accompanying drawings forming part of this specification.

This invention relates to a new and useful improvement in mode of heating flat or smoothing-irons for ironing clothes, and consists in a rectangular-shaped box, open at the bottom side, made of sheet metal or of any suitable material, with apertures more or less in number, (according to the length of the box,) for the admission of the flat-irons with shutters for each, arranged and operating as hereinafter more fully described.

In the accompanying drawings—

Figure 1 represents a top or plan view of the articles.

Figure 2 is a vertical cross-section of fig. 1, on the line x x.

Similar letters of reference indicate corresponding parts.

A represents the box or shell, which is is made of sufficient size to receive three (more or less) flat-irons. The box is open at the bottom, and is designed to rest upon a stove.

In the cross-section the top of a stove and a flat-iron within the box are seen in dotted lines.

B is a flange around the bottom of a box. In the front of the box are apertures for the admission of the flat-irons, from whence slots B' extend through the top to receive the hands.

C represents the shutter for closing the apertures in the front directly behind the irons, and D represents the covers for the apertures or slots in the top between the two parts of the handles, as more distinctly seen in fig. 2.

The shutters C are fast to the upright rods E on which they turn, as on hinges, closing the spaces in the front and those on the top behind the rear part of the handle.

The covers D turn on the pivots F, each having a slotted arm, G, at right angles with the cover.

H represents arms from the upright rods E, which connect with the slotted arms G, as seen in the drawing.

The upright rods E have each a handle, I, by means of which they are turned to operate the shutters and covers C and D.

The effect of turning the handle I to the right is to open both the shutter and cover.

The hook on the cover H slides in the slot till it bears against the outer edge of the slot, and as it describes the arc of a circle it throws the cover from the opening, while it turns the shutter C back so that the flat-iron can be readily admitted or withdrawn.

The advantages of this heater are, it is light and cheap. The heat is confined in the box, and readily heats the iron without unduly heating the handle.

Having thus described my invention,

I claim as new, and desire to secure by Letters Patent—

In combination with the flat-iron heater A, the shutters C, and covers D, constructed and arranged so as to be operated simultaneously by the rods E, substantially as shown and described, for the purpose set forth.

G. O. HANKS.

Witnesses:
HENRY WILMARTH,
GEO. H. DAY.